(No Model.)
T. B. REED & G. ROGERS.
Horse Hay Rake.
No. 231,358. Patented Aug. 17, 1880.
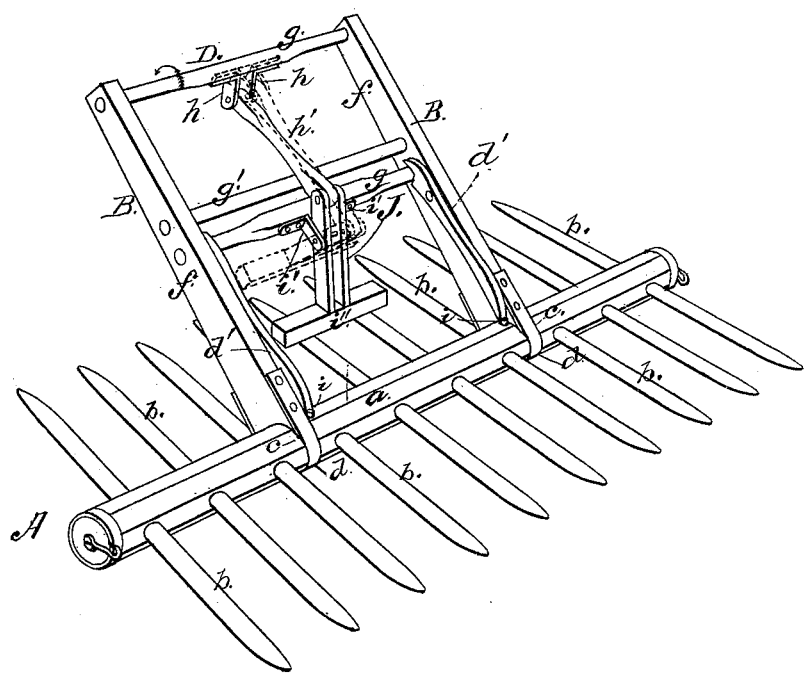
WITNESSES
INVENTOR
Thomas B. Reed
George Rogers,
by E. W. Anderson
their ATTORNEY

UNITED STATES PATENT OFFICE.

THOMAS B. REED AND GEORGE ROGERS, OF VERNON, INDIANA.

HORSE HAY-RAKE.

SPECIFICATION forming part of Letters Patent No. 231,358, dated August 17, 1880.

Application filed April 17, 1880. (No model.)

*To all whom it may concern:*

Be it known that we, THOMAS B. REED and GEORGE ROGERS, of Vernon, in the county of Jennings and State of Indiana, have invented a new and valuable Improvement in Hay-Rakes; and we do hereby declare that the following is a full, clear, and exact description of the construction and operation of the same, reference being had to the annexed drawing, making a part of this specification, and to the letters and figures of reference marked thereon.

The drawing is a representation of a perspective view of my improved rake.

This invention has relation to improvements in flop-over rakes; and it consists in certain novel means whereby the rake-head is locked against turning over and dropping its load, as will be hereinafter more fully set forth.

In the annexed drawing, the letter A designates the rake, composed usually of the beam $a$ and parallel teeth $b$, extending through it or secured thereto in any other practical way.

In the beam $a$, at suitable distances apart, are made the annular grooves $c$, in which are inserted the straps $d$, by means of which the directing-handle B is attached to the rake. The latter is held against rotation in the straps $d$ by means of the pawls $d'$, secured to the side bars, $f$, of the handle, and engaging at their free ends the studs $i$ on the rake-beam $a$. By this means the handle B is made rigid with the rake, which may be thus kept at the proper inclination to the ground.

The engagement of the pawls with the studs aforesaid holds the working-teeth of the rake against upward vibration, so that they gather the hay as the machine is dragged along over the ground.

The side bars of the handle are braced together by the rods $g\,g'$, and afford bearings in their ends to a rock-shaft, D. This shaft has secured to it the angle-irons $h$, between the parallel free ends of which is journaled a rod, $h'$, the remaining end of which is pivoted to a vertically-vibrating lever, J, of the form of the letter T inverted. This lever is fulcrumed in bearings $i'$, extending out from the rigid brace $g$, and its foot $i''$ is of sufficient length to extend across the interval between two of the middle teeth of the rake and bear upon the same, thereby holding the rake against turning and dropping its load.

A sufficient quantity of hay having been collected by the rake, the rock-shaft is turned in the direction indicated by the arrow and the lock or treadle-lever J thrown into the position indicated in dotted lines. When the rake is released the foremost teeth take in the ground, and the rake is turned completely over, thus dropping its load. The rake being released, the rock-shaft is turned in the reverse direction from that aforesaid, and its foot thrown in position for holding the rake as it comes around.

What we claim as new, and desire to secure by Letters Patent, is—

In a rotary rake, the combination, with the rake-head A, having spurs $i$, and the handle B, strapped to said rake-head and having the spring-pawls $d'$, of the rock-shaft handle D, its lever angle-irons $h$, the brace $g$, having bearings $i'$, the T-shaped lever J, pivoted by its middle portion to the bearings $i'$, and the connecting-rod $h'$, pivoted to the upper end of said lever and to the angle-irons of the handle D, substantially as specified.

In testimony that we claim the above we have hereunto subscribed our names in the presence of two witnesses.

THOS. B. REED.
GEORGE ROGERS.

Witnesses:
ORLANDO BACON,
THOMAS McGLASSON.